United States Patent
Baker et al.

(10) Patent No.: US 6,859,922 B1
(45) Date of Patent: Feb. 22, 2005

(54) METHOD OF PROVIDING SOFTWARE TESTING SERVICES

(75) Inventors: Caren H. Baker, Waltham, MA (US); George Friedman, Framingham, MA (US); Michael V. Glik, Newton, MA (US); Walter G. Vahey, Winchester, MA (US)

(73) Assignee: Empirix Inc., Bedford, MA (US)

( * ) Notice: Subject to any disclaimer, the term of this patent is extended or adjusted under 35 U.S.C. 154(b) by 0 days.

(21) Appl. No.: 09/645,279

(22) Filed: Aug. 24, 2000

Related U.S. Application Data

(62) Division of application No. 09/482,178, filed on Jan. 12, 2000.
(60) Provisional application No. 60/151,418, filed on Aug. 30, 1999.

(51) Int. Cl.[7] .................................................. G06F 9/44
(52) U.S. Cl. ...................... 717/125; 717/120; 717/121; 717/124; 705/51
(58) Field of Search ............................... 717/120, 121, 717/124–127; 705/51; 702/186

(56) References Cited

U.S. PATENT DOCUMENTS

| | | | |
|---|---|---|---|
| 4,617,663 A | | 10/1986 | Lake et al. |
| 5,359,546 A | * | 10/1994 | Hayes et al. ................ 702/123 |
| 5,371,883 A | * | 12/1994 | Gross et al. .................. 714/38 |
| 5,537,560 A | * | 7/1996 | Boggs et al. ............... 712/245 |
| 5,671,351 A | | 9/1997 | Wild et al. |
| 5,812,780 A | | 9/1998 | Chen et al. |
| 5,841,670 A | * | 11/1998 | Swoboda ..................... 703/23 |
| 5,881,269 A | | 3/1999 | Dobbelstein |
| 5,974,572 A | | 10/1999 | Weinberg et al. |
| 6,002,869 A | | 12/1999 | Hinckley |
| 6,002,871 A | | 12/1999 | Duggan et al. |
| 6,182,245 B1 | * | 1/2001 | Akin et al. ................... 714/38 |
| 6,209,125 B1 | | 3/2001 | Hamilton et al. |
| 6,226,788 B1 | | 5/2001 | Schoening et al. |
| 6,237,135 B1 | | 5/2001 | Timbol |
| 6,256,773 B1 | | 7/2001 | Bowman-Amuah |
| 6,286,046 B1 | | 9/2001 | Bryant |
| 6,298,478 B1 | | 10/2001 | Nally et al. |
| 6,397,378 B1 | | 5/2002 | Grey et al. |
| 6,401,220 B1 | | 6/2002 | Grey et al. |
| 6,446,120 B1 | | 9/2002 | Dantressangle |
| 6,473,794 B1 | * | 10/2002 | Guheen et al. ............. 709/223 |
| 6,510,402 B1 | * | 1/2003 | Logan et al. ............... 702/186 |
| 6,523,027 B1 | | 2/2003 | Underwood |
| 6,574,578 B1 | | 6/2003 | Logan |

OTHER PUBLICATIONS

Goldschmidt, Art, Horstmann, Paul, Laurentiev, John, "Exploiting Enterprise JavaBeans in the NIIIP Virtual Enterprise", IEEE 1998, p. 124–135, retrieved from IEEE database Apr. 24, 2003.*

(List continued on next page.)

Primary Examiner—Antony Nguyen-BA
Assistant Examiner—Mary J. Steelman
(74) Attorney, Agent, or Firm—Chapin & Huang, L.L.C.; David W. Rouille, Esq.

(57) ABSTRACT

A system that provides easy testing of software objects and reduces the burden on a program developer for maintaining a test system is presented. The system accepts as an input objects and automatically creates test drivers for these objects. The test objects are provided to a test bed comprising an application server where the objects are tested by application of the test drivers.

In a preferred embodiment, the test bed comprises a collection of application servers. An application service provider provides the system test driver and the test bed. Access to the test system is provided by passing a representing of the object under test to the application service provided through a network interface. The application service provider provides test services on a fee for service basis.

17 Claims, 1 Drawing Sheet

OTHER PUBLICATIONS

Ritter, David, "The Middleware Muddle", Dec. 1998, p. 86–93, retrieved from ACM Portal database Apr. 24, 2003.*

Berg: "The State of Java Application Middleware, Part 1;" JavaWorld Facting Innovation, Mar. 1999; pp. 1–19.

Hemrajani; "The State of Java Middleware, Part 2: Enterprise JavaBeans;" JavaWorld Facting Innovation, Apr. 1999; pp. 1–24.

Johnson; "The BeanBox: Sun's Java Container;" JavaWorld Facting Innovation, Sep. 1997; 5 pages.

Lewandowski; "Frameworks for Component–Based Client/Server Computing;" AMC Computing Surveys. vol. 30, No. 1, Mar. 1998: pp. 3–27.

Nolan: "A Look at e–Test Suite 3.1 by RSW:" Software Testing & Quality Engineering: Jul./Aug. 1999; www.stqemagazine.com; 2 sheets.

Sunsted: "Zip Your Data and Improve the Performance of Your Network–Based Applications;" JavaWorld Fueling Innovation, Nov. 1998; 9 sheets.

"Mercury Interactive Announces Load Testing Support for BEA Jolt Web–Based Applications;" Business Wire; New York; Dec. 7, 1998; Business Editors/Computer and Technology Writers; 3 sheets.

"Mercury Interactive TestSuite Enterprise;" 1999 ComputerWire PLC: Jun. 1999: pp. 5621–5627.

* cited by examiner

METHOD OF PROVIDING SOFTWARE TESTING SERVICES

CROSS REFERENCE TO RELATED APPLICATIONS

This application claims priority from provisional U.S. application 60/151,418 filed Aug. 30, 1999, and is a divisional of U.S. application Ser. No. 09/482,178 filed on Jan. 12, 2000, for Method and System for Software Object Testing, which is hereby incorporated by reference.

BACKGROUND OF THE INVENTION

This invention relates generally to computer software applications and more specifically to testing computer software applications.

A traditional client/server application is run in an enterprise that includes several client computers such as individual workstations. These workstations are connected, typically over a network to a central computer that is programmed with an application. The application program contains the business logic—or the instructions to perform the steps needed to make the application useful to the business that is using it. For example, the business logic for an application used by an insurance company would define such things as what types of insurance policies could be issued or the cost for each policy. The application program would also include transaction management software. The transaction management software would do such things as store and retrieve information from a database and pass the appropriate data back to the clients. Additionally, the application program would contain session control software. As multiple clients try to access the application, there must be control to ensure that these clients all operate properly. The session control software provides this control.

It should be noted that the user interface to the system is through the clients. A human user will input data through a client computer and call up data on the screen of the client computer. To test the application, the user interface has been the traditional point of connection to the system. Test systems that simulate the operation of the user can input data through the user interface and determine whether the appropriate results are achieved.

Traditionally, one of a few types of tests is performed. A functional test is a test in which an input is applied and an output is observed. If the expected output is not observed, it can be inferred that the program under test is not functioning correctly. Another type of testing is called load testing. Load testing is particularly important in a client/server application where there are many clients that could be operating simultaneously. As more clients operate, the response time slows down. In a load test, the test system stimulates more client/server interactions and measures the response time. Another type of test is called a regression test. The object of a regression test is to determine whether the performance of a piece of software has changed. Such a test might be used during software development to verify that the software was not adversely impacted by a change in the program. In a regression test, a known set of inputs is applied and the results measured and compared to values that were observed at a prior time (called the baseline) when the test was run.

A more recently developed architecture for an enterprise wide application is described as an N-tier enterprise model. This model also includes clients and a server. The server does the same functions as in a traditional application, however, the specific programs providing these functions are different. One difference is that the transaction management and session are not provided by the application program. Rather, they are provided by an application server, which is more generally described as a "container." It will be appreciated that there are a finite number of functions that must be provided in order to do transaction management, such as store and retrieve data. Thus, there is no need to have application specific programs for each of these functions. The same is true for session control software. While the clients in each application might be doing different things, the need to coordinate the simultaneous use of all the clients is uniform across all applications. This function, too, is provided by the application server.

The business logic is the only function that is unique to the application. In the N-Tier enterprise model, the business logic is programmed as objects. One common programming language used for enterprise wide applications is a programming language capable of being interpreted by a network browser. One such programming language is often referred to as JAVA® (a registered trademark of Sun Microsystems). While any programming language could be used, in the description of the preferred embodiment the programming language JAVA® will be referred to. Objects in JAVA® that execute the business logic are often called "beans." In the description of the preferred embodiment, the objects will be referred to as JAVAbeans™. However, it should be appreciated that objects created in other languages (also known as software components) might be used and could be tested in the same manner as described herein. Also, it is not strictly necessary that the business logic be implemented in an object-oriented language. The term "object" will be used in conjunction with the preferred embodiment. Also, the term Enterprise JAVAbean™, or EJB, will be used in conjunction with the preferred embodiment. However, it should be understood that the invention is not limited to testing enterprises that are programmed with an object-oriented language.

The application server is a commercially available program. There are approximately 5 widely used and commercially available application servers. Having the application server commercially available reduces the time it takes a programmer to develop an application. The application programmer can focus only on the objects needed to program the business logic. Testing should also focus on the objects that contain the business logic.

A further benefit that has resulted from the use of application servers is that the EJBs can be re-used in different applications, which will also run on the application servers. While not all applications will use any given EJB, it is possible that an EJB will perform a function used by similar applications. For example, many applications set up to take orders from consumers will have an EJB that performs the function of receiving and validating a credit card number. Thus, an application developer might write an EJB for this function and use that EJB for every order entry application developed.

We have identified several test challenges that result from the new architecture. First, the EJB has no user interface. As a result, the standard methods of testing through the user interface are not well suited to this type of testing because the user interface would have to be simulated before testing. Secondly, the EJB is often developed with the expectation that it will operate with any application server that might be available. In theory, each application server should respond to the software that is applied to it in the same way because each application server should meet a common specification. In practice, though, an EJB might perform differently on different application servers and might not work at all on some. It would be desirable to provide a service which tests software objects and thereby relieves the burden on a program developer to provide and support hardware and software for testing the software component or application.

SUMMARY OF THE INVENTION

With the foregoing background in mind, it is an object of the invention to provide a system that provides easy testing of software objects and to reduce the burden on a program developer for maintaining a test system. The foregoing and other objects are achieved in a system that accepts as input objects and automatically creates test drivers for these objects. The test objects are provided to a test bed comprising an application server including an Operating System and system level software libraries. The test bed is where the objects are tested by application of the test drivers.

In a preferred embodiment, the test bed comprises a collection of application servers. In accordance with another feature of the preferred embodiment, a system to create the test driver and the test bed are provided by an application service provider. Access to the test system is provided by passing a representing of the object under test to the application service provided through a network interface. According to another aspect of the preferred embodiment, the application service provider provides test services on a fee for service basis.

BRIEF DESCRIPTION OF THE DRAWINGS

The invention will be better understood by reference to the following more detailed description and accompanying drawings in which.

DETAILED DESCRIPTION

Figure 1:
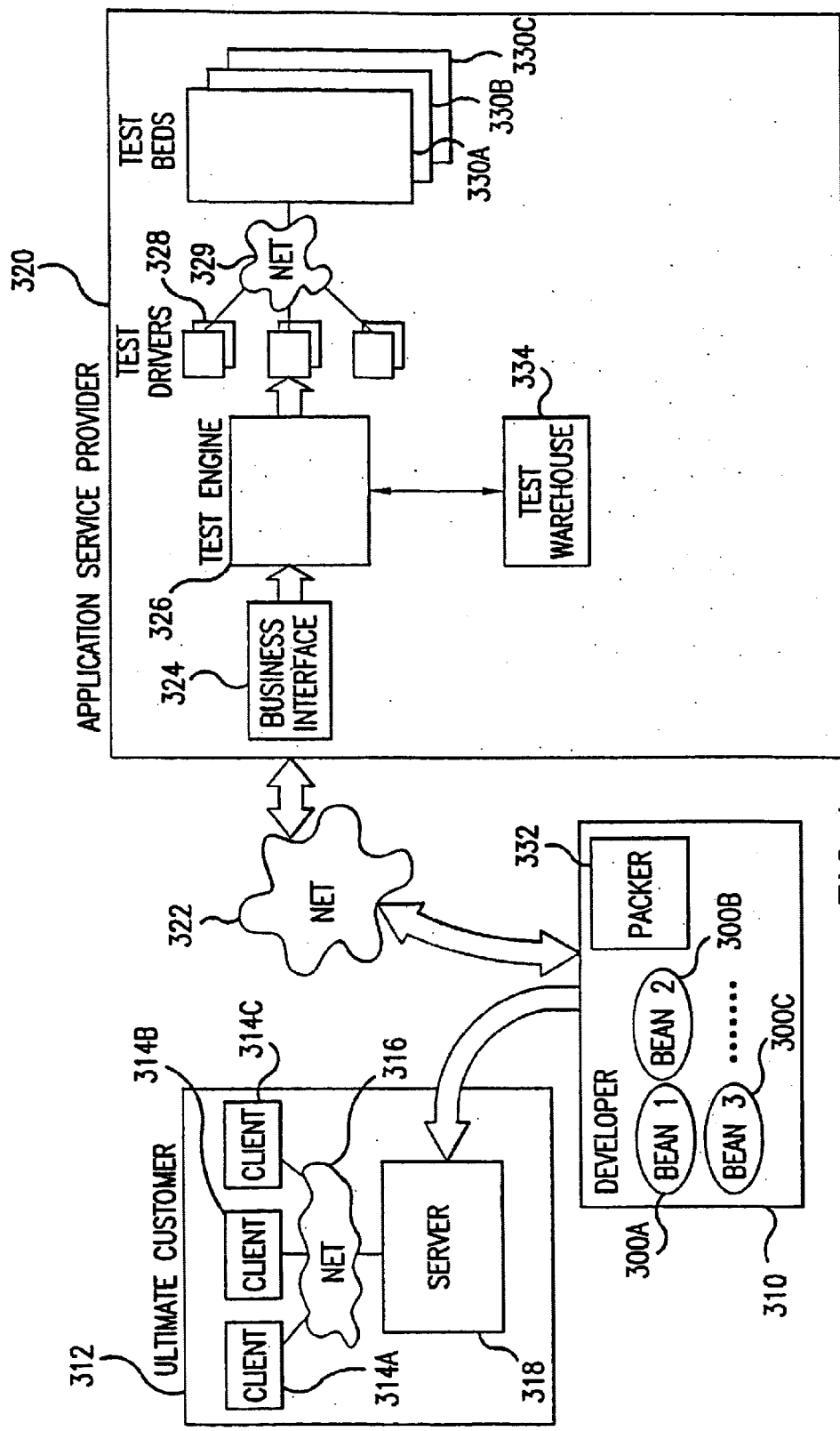
FIG. 1 depicts a system according to a preferred embodiment of the invention.

FIG. 1 illustrates that program objects, such as EJBs 300a . . . 300c are created by an application developer 310. While the invention is described in relation to testing EJBs, it should be appreciated that other software components and applications could also be tested in a similar manner. It is intended that these beans will ultimately be assembled into an application to be used by ultimate customer 312. Customer 312 operates a client server application that includes clients 314a . . . 314c and a server 318. The clients are connected to the server through some form of network 316. Often the network is a TCP/IP network or some other form of intranet. The specifics of the network are not important to the invention.

Server 318 is equipped with an application server, which is commercially available software. The developer might or might not be aware of the specific application server that will be used. However, the developer would like to be able to test the EJBs 300A . . . 300C without limiting the testing to a specific application server and without having to create the environment that will be used by the ultimate customer 312.

Application service provider (ASP) 320 provides a service to allow testing of the EJBs 300A . . . 300C. The EJBs are provided to the ASP 320 over network 322 or by other transport means. Network 322 is in a preferred embodiment the Internet. If the Internet is used for the connection, all of the items depicted as part of the ASP 320 can be remote from either the developer's site or the site of the ultimate customer 312. It should be appreciated that if the ASP 320 owns the software and hardware for testing, then the developer does not have to spend the money to buy and maintain this equipment and software.

Interaction between the developer and the application service provider is provided by a business interface 324. The business interface 324 ensures that the developer 310 provides the appropriate data. The business interface 324, as is known for many web based applications that charge for goods or services, also obtains credit information so that a fee can be assessed for the testing services that can be obtained from ASP 320. Business interface 324 can then do such business functions as collect a fee for the testing service provided. Business interface 324 might also provide service such as scheduling test times and otherwise managing the way developers access ASP 320.

Some of the data that must be provided to ASP 320 is the EJBs that are to be tested, the kinds of test that are to be run and instructions on how to process the results. It is not necessary that this information be provided all at once. It is likely that the exchange of information will be interactive. For example, in the initial interaction, the EJBs to be tested might be provided. Then the tests to be run could be selected and a source of data for those tests might be indicated. Once the tests are run, the format of the output might be specified. Interactions between the developer and the ASP are described in more detail below.

Once the information is available to the ASP 320, test engine 326 is provided with the information. Test engine 326 creates a set of test drivers 328. There is a test driver for each test and each data set to be used in the test. The number and kinds of test drivers that are to be created are determined from the information provided by the developer.

The EJB to be tested is then loaded into a test bed 330A . . . 330C. The system provides multiple test beds, each representing one of the containers (or application servers) which with the EJB is to be used. Depending on the inputs provided by the developer, the EJB might be tested within one or more of the test beds. For purposes of explanation, testing within one test bed will be described. However, it will be appreciated that an important ability of the invention is to allow testing of a EJB in multiple containers for such things as determining differences in performance in different containers or containers in which the EJB will not work.

Once the EJB under test is loaded into the test bed, the test drivers are run. The test drivers simulate the operation of clients 314A . . . 314C. The connection to the test bed is made over a network 329. As with network 316, this could be a TCP/IP network or some other type of network. It could also be the Internet. It could be that the test bed was physically on the same computer hardware as the test drivers, which would avoid the need for any physical network connection. However, because the ASP 320 could be providing test services to many developers simultaneously, it is expected that many separate computers will be used to implement the test beds 330A . . . 330C.

A further service that ASP 320 might provide is a test management service. Significant effort must be expended in a development organization to track the testing that has been done. For example, for a regression test, it is necessary that a baseline is stored and the same test data used to create the baseline must be used for future regression testing. For functional testing, the data sets with the inputs and expected outputs must be available. ASP 320 includes a test warehouse 334. As tests are run, information about the tests and also the data used can be stored in the test warehouse 334. As with testing services, the test warehousing services are in a preferred embodiment provided for a fee, which business interface 324 tracks and assesses.

It was described above that tests were performed on a single EJB. It is possible that multiple EJBs are to be tested simultaneously and the developer will specify that a test will include multiple EJBs that would have to be provided to ASP 320.

However, even when an application developer thinks that a single EJB or a few EJBs are to be tested, it is possible that simply sending those EJBs will not be sufficient to allow ASP 320 to run the required tests. Object oriented programming languages often have a hierarchy. Objects are included within other objects at a higher level in the hierarchy. Objects at the lower level of the hierarchy can "inherit" attributes from objects that are at higher levels in the hierarchy. For example, an EJB might use methods (which are executable code) or properties (which are like variables) that have been inherited from an object at a higher level of the hierarchy. Thus, if only the lower level EJB were passed to ASP 320, it would not have sufficient information to conduct the test on that EJB. Specifically, it would lack the methods and properties defined at the higher levels of the hierarchy.

To enable ASP to conduct testing on an EJB, it must have access to the higher level EJBs from which that EJB has inherited attributes. To provide this access, the business interface 324 downloads to the developer a packer 332. Packer 332 is a program resident on the developer's computer that can find on the computer memory certain EJBs and send them to ASP 320. Packer 332 knows which EJBs to obtain because each EJB includes a portion that describes the dependencies of that EJB. In JAVA®, an EJB is represented as a jar JAVA® Archive) file. The jar file contains the executable code of the EJB in addition to a description of the dependencies of the file. In this way, business interface 324 can figure out all the EJBs that are needed to test a specific EJB. These EJBs could be uploaded to ASP 320 for the test. While a jar file is described in relation to EJBs, it should be understood that any archive relating to the software component being employed could also be used.

For functional testing of the EJBs, the data for the tests can come from one of several different sources. One possibility is that the user can provide the data sets for the tests. Each data set would specify inputs and expected outputs for a particular method. A test driver would be constructed that would invoke that method with the specified input data. When the test engine ran that driver, it could compare whether the expected data were observed.

It is also possible that the test data could be obtained in an automated or semiautomatic fashion. Each JAVAbean™ contains a public interface that specifies the methods and properties of that bean. From the interface, it is possible to know which properties must be provided and measured to test a particular method. Thus, a table could be constructed for each method, listing the inputs and the outputs encountered in executing that particular method. A data set for testing the method would have to have data values for each entry in that table.

Once the data table is generated, the inputs could be filled in automatically in a random fashion. Test generation software, such as TestMaster sold by Teradyne Software and System Test of Nashua, N.H. could be used to create the expected outputs. TestMaster is a program that receives a description of a system (including a software object) under test. It can generate a set of inputs that should test the system and, based on the description of the system that has been input, can also determine an expected output.

However, there are many types of tests that can be done without knowing the expected output value. For example, a regression or load test does not need to know the "right" output value. For regression testing, it only matters that the value is same or different than the baseline. For load testing, it matters how long it took the output to be provided. Another test than can be done without knowing the expected outputs is a check to see that the appropriate input was properly recorded by the EJB. As a further example, some tests are simply intended to track the execution of the EJBs. Test engine 326 can access test beds 330A . . . 330C to determine which methods were accessed during a test and can also determine whether a particular test driver invoked a bean that executed to normal completion. For example, test engine 326 would know whether a particular method terminated because of an error or exception condition—which might signify a problem with the EJB. To run this type of test, the expected values of the outputs are also not required to be known. Rather, occurrences during the invocation of the bean that are the useful information desired by the developer. Thus, it might not be necessary to generate expected outputs to perform the required tests.

However, where it is necessary to perform a functional test without an automated test generation tool being available, it is possible that the developer will provide the expected output values. ASP 320 could provide a template data table for each method of the EJB under test. This would tell the data values that the developer would need to provide to test the EJB. By automatically generating the data tables from the information in the bean's .jar file, the developer knows the minimum set of data values that need to be provided, thereby reducing the test creation time. The ASP 320 could generate the inputs and have the developer specify the appropriate outputs or the developer could specify both the inputs and the outputs to the test.

An example of a test session for a particular embodiment will be described. A typical test session would be initiated by a developer "logging on" to the ASP web site. Each developer would have an account with the ASP, so that space on the ASP computers could be allocated to the storage of their test information and to enable appropriate billing. During the registration process, the ASP would seek permission to download the packer 332 to the developer's computer and install that packer.

The developer would transfer the bean or beans to be tested to the ASP by uploading the .jar files for these EJBs. A user interface from ASP 320 would guide the developer through the provision of the data needed to specify the tests to be performed. The user interface would also guide the developer through identifying which data to use to develop test drivers. The developer might specify a data set from the test archive or might provide the data set or might specify that the ASP should generate the data automatically. A developer might also specify the containers (or application servers) with which to test the EJBs. Data tables could have data values, references to other data tables, and/or program code fragments.

The ASP 320 would create the test drivers and prepare them in a format for a human to read them. The test drivers would then be provided to the developer. The developer might then edit the test drivers. The developer might put what is the equivalent of "break points" in the test drivers. When a break point is encountered, the test driver would either stop execution or would record values of variables or execution state. The developer might specify exception or error handling conditions. The developer would choose the edits to make based on knowledge to the EJB under test and the information that is expected to be generated by the testing. The modified drivers would be uploaded to ASP 320.

When the developer had specified the required information, the developer would initiate the test. During execution, the ASP would perform the required steps automatically. It would deploy the EJBs (which means that they would be loaded into the application servers in the ASP). The ASP would also invoke the test drivers. If necessary, the ASP would schedule the tests to be run. As with other web sites shared by multiple users, it would be necessary to ensure that each test were run at a time when hardware resources were available and so, depending on the load, some scheduling might be required.

Once the test drivers had been executed, the results of the test would be available. The developer would specify which results would be displayed and their formats. For example, for functional testing, the developer would likely view results in a pass/fail format. For load testing, the developer would probably specify a graphical output, showing response time as a function of the number of EJBs simultaneously executing. Alternately, results for load testing might be viewed in a pass/fail format as measured against specification limits.

Once the sessions were completed, ASP 320 would tally the operations performed and compute and send a bill for the services actually used.

It will be appreciated that the ASP 320 is very similar to many other web based applications. It has a user interface that uploads and downloads code from a user. The specific application on ASP 320 is a test application. While many of the specific test capabilities described above have never heretofore been done, having read the foregoing description and attached materials, one of skill in the art will understand how to implement ASP 320.

Having described one embodiment, numerous alternative embodiments or variations might be made. For example, various servers are described. The servers might be located on different pieces of computer hardware or on the same pieces of computer hardware.

Also, a service for application developers was described. The service might be used by application integrators or even the ultimate customer for software maintenance, life cycle testing, or as part of an acceptance or qualification procedure.

As another example, it was described that certain functions were performed by the business interface. The functions might be performed by different pieces of code or code resident on different computers. For example, it is not necessary that business interface 324 determine which EJBs must be provided along with the EJB under test. This function could be performed by test engine 326 or by packer 332. The overall functioning of the system would be the same.

Particularly, it was described that ASP 320 is located remotely from the site of the ultimate customer and the developer. In a preferred embodiment ASP 320 is accessed over the Internet. However, some developers might prefer not to transmit their code under development over the Internet. In that case, the functions described as part of ASP 320 would be installed on a server at the developer's site. In that case, net 322 would be the developer's internal network rather than the Internet.

Also, it was described that a data table was constructed to describe the parameters in a data set. It will be appreciated that the table is conceptual. The data might be physically stored in any kind of data structure and might be stored in some other way—such as in a text file instead of a data structure. Object recording is a method of saving and replaying user defined data structures.

Further, certain types of tests were described above. The list is intended to be illustrative rather than limiting. ASP 320 might provide other types of tests. It might provide a compliance test, for example, to verify that each EJB is in compliance with the specifications for objects written in JAVA® or another appropriate language. Alternatively, ASP 320 might test to determine whether a particular EJB uses any features that are not supported by a particular application server.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing a software testing service comprising the steps of:

receiving, by a service provider, at least one reusable object oriented software component to be tested from a customer, wherein the at least one reusable object oriented software component includes software instructions;

providing, by said service provider, test code for testing said at least one reusable object oriented software component and wherein said step of providing further comprises the step of determining the parameters of the data sets to test a reusable object oriented software component by examining the interface of each method in the reusable object oriented software component and determining what inputs and outputs must be specified for that reusable object oriented software component;

testing with said test code said at least one reusable object oriented software component;

monitoring, by said service provider, results of said testing; and providing, by said service provider, the results of said testing of said reusable object oriented software component to said customer.

2. The method of claim 1 further comprising the step of charging said customer for providing said reusable object oriented software component testing service.

3. The method of claim 2 wherein said step of charging is performed on a per session basis.

4. The method of claim 2 wherein said step of charging is performed on a periodic basis.

5. The method of claim 1 wherein said step of receiving the at least one reusable object oriented software component to be tested is done over a network.

6. The method of claim 5 wherein said step of receiving the at least one reusable object oriented software component to be tested is done over a TCP/IP network.

7. The method of claim 5 wherein said step of receiving the at least one reusable object oriented software component to be tested is done over the Internet.

8. The method of claim 1 wherein said step of receiving the at least one reusable object oriented software component to be tested further comprises the step of receiving directions regarding the type of testing to be done on said at least one reusable object oriented software component.

9. The method of claim 8 wherein said step of receiving directions regarding the type of testing to be done is selected from the group consisting of functional testing, regression testing, load testing and compliance testing.

10. The method of claim 1 wherein said step of receiving the at least one reusable object oriented software component to be tested further comprises the step of receiving directions regarding how to process results from said testing.

11. The method of claim 1 wherein at least a portion of the results from said testing is provided in a pass/fail format.

12. The method of claim 1 wherein at least a portion of the results from said load testing are provided in a graphical format.

13. The method of claim 1 wherein said at least one reusable object oriented software component to be tested comprises a reusable object oriented software component which can be interpreted by a web browser.

14. The method of claim 1 wherein said software testing service is provided as a web site.

15. The method of claim 1 wherein said step of providing further comprises the step of providing access to multiple containers for testing the performance of said reusable object oriented software component in different ones of said multiple containers, wherein each of the multiple containers comprises one or more portions of software code associated with one or more respective application servers.

16. The method of claim 1 wherein said step of testing further comprises the step of testing selected ones of the at least one reusable object oriented software components typically used through a graphical user interface by building test drivers for the selected ones of the at least one reusable object oriented software components and testing without the graphical user interface.

17. The method of claim 1 further comprising the step of using a test warehouse to store test data for customers for later use by the customers.

* * * * *